(12) United States Patent
McHugh et al.

(10) Patent No.: US 8,800,034 B2
(45) Date of Patent: Aug. 5, 2014

(54) INSIDER THREAT CORRELATION TOOL

(75) Inventors: Brian McHugh, Charlotte, NC (US);
Ronald Ramcharran, Hackensack, NJ (US); Peter J. Langsam, New York, NY (US); Timothy C. Metzger, Hoboken, NJ (US); Dan P. Antilley, Fort Mill, SC (US); Jonathan W. Deats, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 24 days.

(21) Appl. No.: 13/298,594

(22) Filed: Nov. 17, 2011

(65) Prior Publication Data

US 2012/0066763 A1   Mar. 15, 2012

Related U.S. Application Data

(63) Continuation-in-part of application No. 12/694,067, filed on Jan. 26, 2010, and a continuation-in-part of application No. 12/694,075, filed on Jan. 26, 2010, and a continuation-in-part of application No. 12/841,323, filed on Jul. 22, 2010, now Pat. No. 8,474,042, and a continuation-in-part of application No. 12/841,332, filed on Jul. 22, 2010.

(51) Int. Cl.
*G06F 11/00* (2006.01)
*H04L 29/06* (2006.01)
*G06F 21/57* (2013.01)

(52) U.S. Cl.
CPC ............... *H04L 63/20* (2013.01); *H04L 63/14* (2013.01); *G06F 2221/2115* (2013.01); *G06F 2221/2117* (2013.01); *G06F 21/577* (2013.01); *G06F 2221/2101* (2013.01)
USPC .......................................................... 726/22

(58) Field of Classification Search
CPC .............................. G06F 21/577; H04L 63/14
USPC .................................... 726/22, 23, 24, 25, 26
See application file for complete search history.

(56) References Cited

U.S. PATENT DOCUMENTS 5,623,600 A   4/1997   Ji et al.
6,151,643 A   11/2000  Cheng et al.

(Continued)

FOREIGN PATENT DOCUMENTS

| EP | 1335559 A2 | 8/2003 |
|---|---|---|
| GB | 2420961A A | 6/2006 |
| GB | 2436161 A | 9/2007 |

OTHER PUBLICATIONS

Office Action dated Sep. 26, 2012 in related U.S. Appl. No. 12/841,332, (24 pages).

(Continued)

*Primary Examiner* — Samson Lemma
(74) *Attorney, Agent, or Firm* — Banner & Witcoff, Ltd.; Michael A. Springs

(57) ABSTRACT

Systems and methods for calculating threat scores for individuals within an organization or domain are provided. Aspects of the invention relate to computer-implemented methods that form a predictive threat rating for user accounts. In one implementation, a first threat score representing a first time period may be calculated. The first threat score may be compared with aspects of the same user accounts for a second time period. Weighting schemes may be applied to certain activities, controls, and/or user accounts. Further aspects relate to apparatuses configured to execute methods for ranking individual user accounts. Certain embodiments may not block transmissions that violate predefine rules, however, indications of such improper transmission may be considered when constructing a threat rating. Blocked transmissions enforced upon a user account may also be received. Certain activity, such as accessing the internet, may be monitored for the presence of a security threat and/or an ethics threat.

10 Claims, 6 Drawing Sheets

(56) References Cited

U.S. PATENT DOCUMENTS

| | | |
|---|---|---|
| 6,269,456 B1 | 7/2001 | Hodges et al. |
| 6,785,820 B1 | 8/2004 | Muttik et al. |
| 6,792,543 B2 | 9/2004 | Pak et al. |
| 7,080,000 B1 | 7/2006 | Cambridge |
| 7,080,408 B1 | 7/2006 | Pak et al. |
| 7,114,183 B1 | 9/2006 | Joiner |
| 7,151,447 B1 | 12/2006 | Willms et al. |
| 7,228,565 B2 | 6/2007 | Wolff et al. |
| 7,237,258 B1 | 6/2007 | Pantuso et al. |
| 7,237,267 B2 | 6/2007 | Rayes et al. |
| 7,278,019 B2 | 10/2007 | Norman |
| 7,340,438 B2 | 3/2008 | Nordman et al. |
| 7,418,733 B2 | 8/2008 | Connary et al. |
| 7,457,965 B2 | 11/2008 | Tamura et al. |
| 7,509,680 B1 | 3/2009 | Sallam |
| 7,546,334 B2 | 6/2009 | Redlich et al. |
| 7,739,211 B2 | 6/2010 | Coffman et al. |
| 7,895,448 B1 | 2/2011 | Satish |
| 8,256,004 B1 | 8/2012 | Hill et al. |
| 8,275,899 B2 | 9/2012 | Beckett, III et al. |
| 8,280,844 B2 | 10/2012 | Warn et al. |
| 8,474,042 B2 | 6/2013 | Sorensen et al. |
| 8,478,708 B1 | 7/2013 | Larcom |
| 8,479,286 B2 | 7/2013 | Dalcher et al. |
| 2003/0145228 A1 | 7/2003 | Suuronen et al. |
| 2003/0191957 A1 | 10/2003 | Hypponen et al. |
| 2003/0236995 A1 | 12/2003 | Fretwell |
| 2004/0044912 A1* | 3/2004 | Connary et al. ............... 713/201 |
| 2004/0153650 A1 | 8/2004 | Hillmer |
| 2005/0044406 A1 | 2/2005 | Stute |
| 2005/0050334 A1 | 3/2005 | Liang et al. |
| 2005/0086526 A1 | 4/2005 | Aguirre |
| 2005/0086538 A1 | 4/2005 | Kubota |
| 2005/0183143 A1 | 8/2005 | Anderholm et al. |
| 2005/0187934 A1 | 8/2005 | Motsinger et al. |
| 2005/0188221 A1* | 8/2005 | Motsinger et al. ............ 713/201 |
| 2005/0188222 A1 | 8/2005 | Motsinger et al. |
| 2005/0188423 A1 | 8/2005 | Motsinger et al. |
| 2005/0203881 A1 | 9/2005 | Sakamoto et al. |
| 2005/0273851 A1 | 12/2005 | Raju Datla et al. |
| 2006/0004594 A1 | 1/2006 | Doliov |
| 2006/0020814 A1 | 1/2006 | Lieblich et al. |
| 2006/0041505 A1 | 2/2006 | Enyart |
| 2006/0064740 A1 | 3/2006 | Kelley et al. |
| 2006/0178918 A1 | 8/2006 | Mikurak |
| 2007/0079379 A1 | 4/2007 | Sprosts et al. |
| 2007/0113281 A1 | 5/2007 | Leach |
| 2007/0143851 A1 | 6/2007 | Nicodemus et al. |
| 2007/0169194 A1 | 7/2007 | Church et al. |
| 2007/0180510 A1 | 8/2007 | Long et al. |
| 2007/0186282 A1 | 8/2007 | Jenkins |
| 2007/0204345 A1 | 8/2007 | Pereira et al. |
| 2007/0222589 A1 | 9/2007 | Gorman et al. |
| 2007/0226796 A1 | 9/2007 | Gilbert et al. |
| 2007/0245420 A1 | 10/2007 | Yong et al. |
| 2007/0268880 A1 | 11/2007 | Bellur et al. |
| 2008/0034424 A1 | 2/2008 | Overcash et al. |
| 2008/0082348 A1 | 4/2008 | Paulus et al. |
| 2008/0109730 A1 | 5/2008 | Coffman et al. |
| 2008/0162385 A1 | 7/2008 | Madani et al. |
| 2008/0181213 A1 | 7/2008 | Ovsiannikov et al. |
| 2008/0198231 A1 | 8/2008 | Ozdemir et al. |
| 2008/0222734 A1 | 9/2008 | Redlich et al. |
| 2008/0244034 A1 | 10/2008 | Shannon et al. |
| 2008/0250484 A1 | 10/2008 | Chong et al. |
| 2008/0256602 A1 | 10/2008 | Pagan |
| 2008/0271143 A1 | 10/2008 | Stephens et al. |
| 2008/0282339 A1 | 11/2008 | Nakae et al. |
| 2009/0013410 A1 | 1/2009 | Kaler et al. |
| 2009/0037997 A1 | 2/2009 | Agbabian et al. |
| 2009/0043724 A1 | 2/2009 | Chesla |
| 2009/0044005 A1 | 2/2009 | Komura et al. |
| 2009/0064332 A1 | 3/2009 | Porras et al. |
| 2009/0077666 A1* | 3/2009 | Chen et al. ....................... 726/25 |
| 2009/0126023 A1 | 5/2009 | Yun et al. |
| 2009/0132813 A1 | 5/2009 | Schibuk |
| 2009/0138592 A1 | 5/2009 | Overcash et al. |
| 2009/0178139 A1 | 7/2009 | Stute et al. |
| 2009/0178144 A1 | 7/2009 | Redlich et al. |
| 2009/0198765 A1 | 8/2009 | Stamos et al. |
| 2009/0207740 A1 | 8/2009 | Crotti et al. |
| 2009/0241188 A1 | 9/2009 | Komura |
| 2009/0249131 A1 | 10/2009 | Mitomo |
| 2009/0254572 A1 | 10/2009 | Redlich et al. |
| 2009/0271863 A1 | 10/2009 | Govindavajhala et al. |
| 2009/0293128 A1 | 11/2009 | Lippmann et al. |
| 2009/0328209 A1* | 12/2009 | Nachenberg ..................... 726/22 |
| 2010/0064039 A9* | 3/2010 | Ginter et al. .................. 709/224 |
| 2010/0065039 A1 | 3/2010 | Chang et al. |
| 2010/0121833 A1 | 5/2010 | Johnston |
| 2010/0125911 A1 | 5/2010 | Bhaskaran |
| 2010/0169971 A1 | 7/2010 | Raviv |
| 2010/0212010 A1 | 8/2010 | Stringer et al. |
| 2010/0269175 A1 | 10/2010 | Stolfo et al. |
| 2010/0281543 A1 | 11/2010 | Golomb et al. |
| 2011/0078156 A1 | 3/2011 | Koss |
| 2011/0125658 A1 | 5/2011 | Lanxner et al. |
| 2011/0153166 A1 | 6/2011 | Yester |
| 2011/0185056 A1 | 7/2011 | Mchugh et al. |
| 2011/0202969 A1 | 8/2011 | Warn et al. |
| 2011/0225650 A1 | 9/2011 | Margolies et al. |
| 2012/0066763 A1 | 3/2012 | McHugh et al. |

OTHER PUBLICATIONS

International Search Report and Written Opinion issued in related International Patent Application No. PCT/US11/21149, dated Oct. 26, 2011 (15 pages).

International Search Report and Written Opinion issued in related International Patent Application No. PCT/US11/21152, dated Nov. 1, 2011 (14 pages).

International Search Report and Written Opinion issued in related International Patent Application No. PCT/US11/44144, dated Dec. 6, 2011.

U.S. Office action for related U.S. Appl. No. 12/841,332 mailed Mar. 7, 2013.

Office action for related U.S. Appl. No. 12/694,067 mailed Feb. 24, 2014.

Office action for related U.S. Appl. No. 12/694,067 mailed Feb. 13, 2014.

Notice of Allowance for related U.S. Appl. No. 12/694,067 mailed Dec. 9, 2013.

International Search Report and Written Opinion issued in related International Patent Application No. PCT/US11/21149, dated Oct. 26, 2011.

International Search Report and Written Opinion issued in related International Patent Application No. PCT/US11/21152, dated Nov. 1, 2011.

International Search Report and Written Opinion issued in related application No. PCT/US11/32515, dated Jun. 27, 2011.

Office Action in related U.S. Appl. No. 12/694,067 mailed Jul. 30, 2013.

Non-Final office action for related U.S. Appl. No. 13/298,597 mailed Sep. 11, 2013.

Non-Final office action in related U.S. Appl. No. 13/903,215 mailed Sep. 12, 2013.

Office action in related U.S. Appl. No. 13/736,594 mailed Oct. 2, 2013.

International Search Report and Written Opinion of International application No. PCT/US11/44144 mailed Dec. 6, 2011.

Office Action for U.S. Appl. No. 12/841,332 mailed Oct. 1, 2013.

Office action for U.S. Appl. No. 12/841,332 mailed Mar. 7, 2013.

Office action for U.S. Appl. No. 12/841,332 mailed Sep. 26, 2012.

Office action for U.S. Appl. No. 12/841,323 mailed Nov. 29, 2012.

Office action for U.S. Appl. No. 12/841,323 mailed Jun. 6, 2012.

Notice of Allowance for U.S. Appl. No. 12/841,323 mailed Apr. 11, 2013.

International Search Report and Written Opinion for International application No. PCT/US11/44138 mailed Dec. 6, 2011.

Office action for U.S. Appl. No. 12/694,075 mailed Sep. 4, 2013.

(56) References Cited

OTHER PUBLICATIONS

Office action for U.S. Appl. No. 12/694,075 mailed Feb. 4, 2013.
Office action for U.S. Appl. No. 12/694,075 mailed Aug. 10, 2012.
Office action for U.S. Appl. No. 12/694,075 mailed Mar. 27, 2012.
Office action for U.S. Appl. No. 12/694,067 mailed May 22, 2012.
Office action for U.S. Appl. No. 12/694,067 mailed Dec. 21, 2011.
Office action for U.S. Appl. No. 12/694,067 mailed Nov. 7, 2011.
Notice of Allowance for U.S. Appl. No. 12/829,882 mailed Jun. 17, 2013.
Office action for U.S. Appl. No. 12/829,882 mailed Mar. 12, 2013.
Office action for U.S. Appl. No. 12/829,882 mailed Aug. 10, 2012.
Notification of Grant from Singapore Patent Office for Patent P-No. 184508 dated Nov. 15, 2013.
Office action for U.S. Appl. No. 11/932,510 mailed Dec. 2, 2013.
Office action for U.S. Appl. No. 11/932,510 mailed Jul. 11, 2013.
Office action for U.S. Appl. No. 11/932,510 mailed Feb. 7, 2011.
Office action for U.S. Appl. No. 11/932,510 mailed Sep. 28, 2010.
International Search Report and Written Opinion for International application No. PCT/US2008/082087 mailed Jan. 13, 2009.
Examination Report for application No. GB1007370.8 mailed Jan. 24, 2012.
Notification of Grant for patent application No. GB2466755 mailed Jan. 2, 2013.
Notice of Allowance for related U.S. Appl. No. 12/694,067 mailed Mar. 21, 2014.
Office Action for related U.S. Appl. No. 12/694,075 mailed Mar. 13, 2014.
Notice of Allowance in Related U.S. Appl. No. 12/841,332 mailed Mar. 6, 2014.
Notice of Allowance in related U.S. Appl. No. 13/298,597 mailed Apr. 14, 2014.

* cited by examiner

INSIDER THREAT CORRELATION TOOL

BACKGROUND

Increasingly, organizations are responsible for protecting individual's confidential and proprietary electronic information. For example, financial institutions collect and retain vast amounts of personal information in electronic format; therefore the storage and distribution of such information must be closely monitored. This is also true for medical organizations that must effectively collect, store and distribute vast amounts of electronic data while complying with HIPPA (Health Insurance Privacy and Portability Act) and other regulations. Regulating access and distribution of electronic confidential information is more difficult than physical data as it is more readily copied and distributed. Thus, organizations with such information must closely monitor their employees and other individuals to ensure the information is protected, not only from disclosure, but inadvertent contamination.

Prior systems attempted to block certain activities, such as visiting certain sites on the Internet or accessing certain storage devices containing confidential information. Unfortunately, however, blocking sites alone does not provide any indication of a threat. Furthermore, while it may be desirable to block transmissions that pose a serious threat to the organization, blocking each transmission that violates any rule could reduce productivity, efficiency, and frustrate both the holder of the blocked user account, the IT department, and/or any third party that needs to receive the transmission, such as time-sensitive material. Additionally, many systems apply a "one size fits all" security policy, which cannot consider the type of user account being monitored.

Indeed, past attempts often focused on security events, and thus failed to adequately consider and/or account for actions of specific users or individuals. Accordingly, these systems cannot be configured to provide an overall threat rating that considers several different security measures for individuals within an entity or domain. For example, even if an entity has enacted several individual security measures, a specific user may not meet the "threshold" level to be considered a threat for each individual security measure, despite the fact that they have significantly high activity for several measures, and thus pose an overall threat. In contrast, a user who exceeds one security "threshold" level for only a single measure may incorrectly be deemed a security threat to the entity or domain. In this regard, current systems don't adequately consider individual characteristics of users or user accounts. For example, certain job responsibilities may require some users to have higher than usual activity levels or different access requirements.

Current systems for collecting data from different systems strain valuable resources. Often, the time spent collecting data exceeds the time available to stop or minimize the threat. Therefore, the lag in data does not present an up-to-date indication of the entity's current threats. Moreover, current systems do not allow quick analysis of threats that may readily be navigated for more precise information. Novel systems and methods that improve upon one or more of these and other deficiencies would be desirable.

BRIEF SUMMARY

Aspects of the embodiments address one or more of the issues mentioned above by disclosing methods, computer readable media, and apparatuses configured to calculate threat ratings. In this regard, aspects relate to formulating and/or measuring a threat rating of an individual. Certain embodiments relate to computer implemented methods that form a predictive threat rating for an individual. The individual may be among a plurality of individuals, such as members of an organization, including but not limited to: a corporation or business entity. In one embodiment, the predictive rating may be calculated for a plurality of individuals. For example, the predictive rating is calculated for employees of an organization.

In one implementation, a first threat score corresponding to a first time period may be calculated for several users, user accounts, and/or terminals. The first time period may be relatively short, such as less than 3 days. In one embodiment, the first time period may be about 48 hours. In another embodiment, the first time period may be about 1 day. Those skilled in the art will appreciate that the exact length of the first time period may be different, and may depend on the type of user accounts, the type of organization hosting the accounts, the length of a second time period (discussed below) and/or other factors. In one embodiment, each user account may have access to a first network, such as the Internet. Some of the user accounts may also have access to a second network, such as a restricted portion of the organization's intranet.

In one embodiment, certain activity, such as accessing the internet, may be monitored for the presence of a security threat, an ethics threat, or combinations thereof. The monitoring of activity may include blocked activity, in which the user, user account and/or terminal was prohibited from undertaking an action or viewing an internet page. An indication of blocked transmissions enforced upon a user, user account or terminal may also be received. The indication may be restricted to a specific network or group of networks, such as the Internet and/or specific network resources within an organization's intranet that may be restricted to certain users, user accounts, and/or terminals In one embodiment, an indication of any blocked and/or non-blocked communications that meet a predefined criterion from a targeted communication application may be received. Exemplary targeted communication accounts include but are not limited to: email and instant messaging. Thus, certain embodiments may not block transmissions that violate one or more predefine rules, however, indications of such improper transmission may be considered when constructing a threat rating in accordance with various embodiments.

In another embodiment, it may be determined if any communication through a network is transmitted or received through an unauthorized protocol. An indication whether at least one security application is associated with the user account may be received. If the security application is not associated with the account, a specific sub-score may be assigned. Further embodiments determine if the security application has been tampered with or removed, and if so, may assign a different sub-score. In one embodiment, the security application may monitor illegal storage attempts.

In one embodiment, certain activity may be weighted. For example, weights may be applied to: a security threat, an ethics threat, blocked communication through the targeted communication application, communication through the targeted communication application meeting a predefined criterion, accessing the centralized store, an attempted illegal storage attempt, and combinations thereof. In other embodiments, certain user accounts, terminals, and/or users may be weighted. Weighting may be based upon, for example, the account having access to certain data storage devices, whether the account is associated with a security application, job criteria associated with the user of the account, or meeting any predefined criteria.

In further embodiments, the threat score from the first time period may be compared, or otherwise analyzed in conjunction with a second threat score corresponding to a second time period to create an overall threat score. Further weighting may also be considered in one or more embodiments. In one embodiment, an activity weight is applied to certain activities that occurred during a first time frame within the first or second time period. For example, illustrative time frames may include, but are not limited to: a predefined quantity of time before the user associated with the user account is scheduled to utilize a network, a predefined quantity of time before or after the average time frame the user account is active on a network, a holiday, and combinations thereof. Weighting may depend on one or more factors, including for example, the user account's average activity, average activity of other user accounts, or combinations thereof.

Aspects of the embodiments may be provided in a computer-readable medium having computer-executable instructions to perform one or more of the process steps described herein. These and other aspects of the embodiments are discussed in greater detail throughout this disclosure, including the accompanying drawings.

Further aspects relate to systems and methods for displaying the ranking of a plurality of user accounts. In one embodiment, the ranking of several users, user accounts, and/or terminals may be transmitted through a network and displayed as part of a graphical user interface. In one embodiment, a system which comprises a processor and a memory may be configured to transmit electronic signals configured to display the ranking of the user accounts. Further embodiments relate to receiving a user input selecting a graphical representation of certain activities or criteria utilized in the ranking of the users, accounts, and/or terminals. In one embodiment, a graphical display of blocked communications may be displayed. In further embodiments, it may be displayed whether the blocked communication was a security threat, an ethics threat or combinations thereof. Any aspect of a user, user account and/or terminal that may be utilized in calculating the threat score may be displayed.

Further embodiments allow the reception of a user input providing a new account weight to be applied to at least one of the plurality of users, user accounts, and/or terminals. The accounts, or at least a portion thereof, may be re-ranked using the new account weight. In another embodiment, a user input may provide a new weight for at least one control. In further embodiments, a user input may select a user account from the plurality of user accounts, an in response, ranking for a plurality of controls may be displayed for the selected account. Further embodiments may permit the displaying of data relating a user account's average activity (i.e., per control) and/or the average activity of other user accounts.

BRIEF DESCRIPTION OF THE DRAWINGS

The present invention is illustrated by way of example and not limited in the accompanying figures in which like reference numerals indicate similar elements and in which.

DETAILED DESCRIPTION

In accordance with various aspects of the embodiments, methods, computer-readable media, and apparatuses are disclosed that assist in the creation, implementation, and review of predictive threat ratings for several users, user accounts, and/or terminals. The user accounts may be related to an organization, such as employees of an organization.

Figure 1:
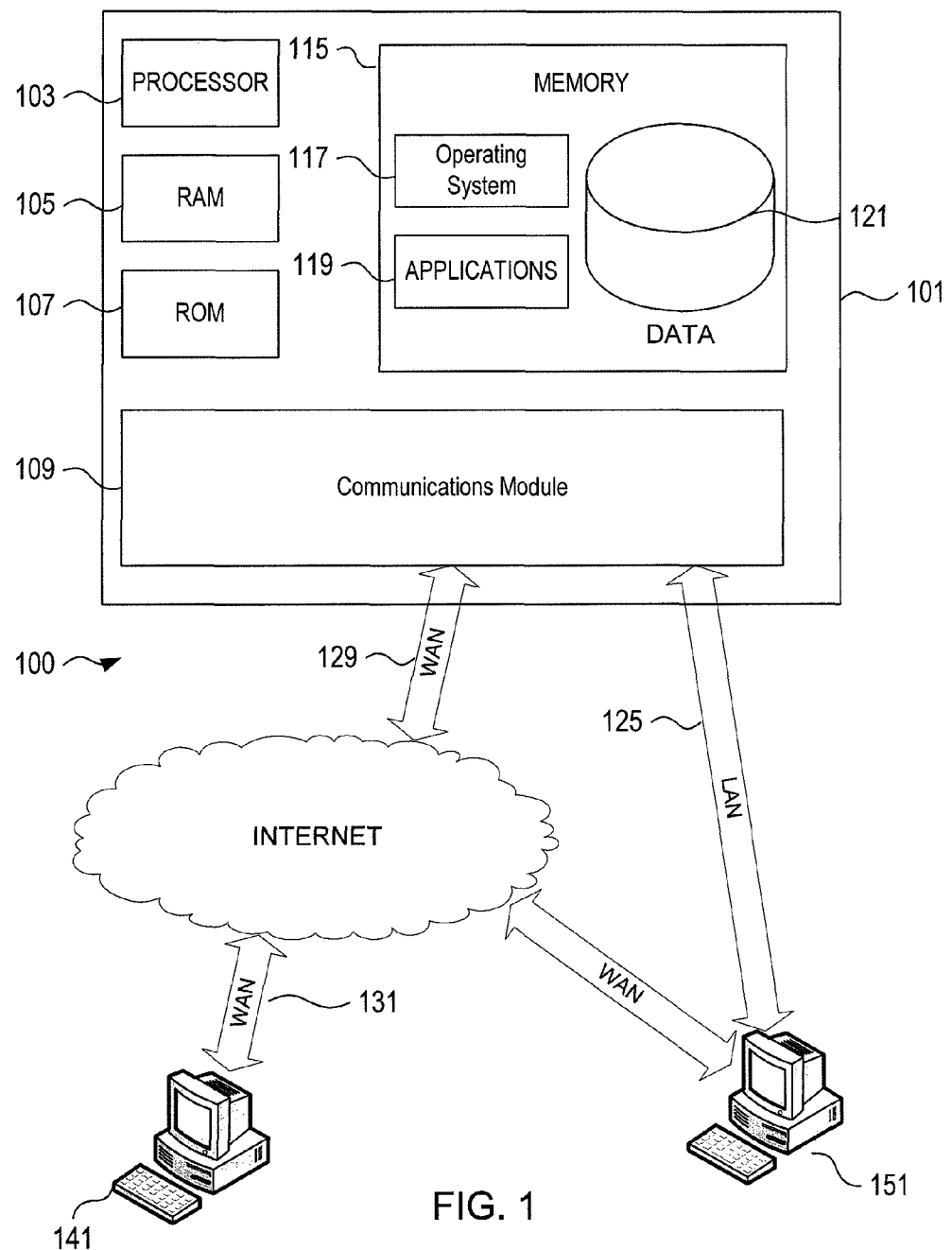
FIG. 1 shows an illustrative operating environment in which various aspects of the embodiments may be implemented.
Figure 2:
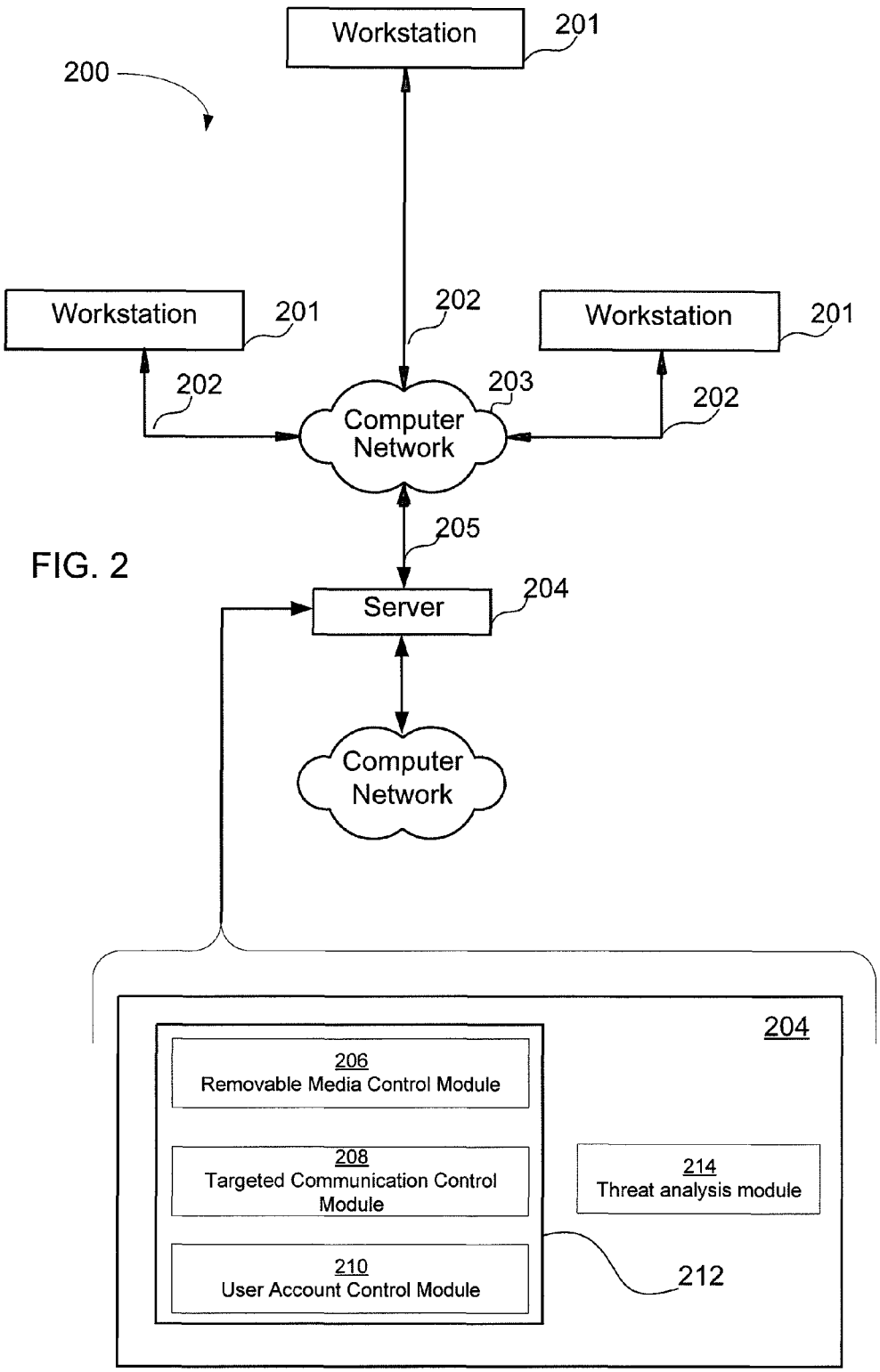
FIG. 2 is an illustrative block diagram of workstations and servers that may be used to implement the processes and functions of certain aspects of the embodiments.
Figure 3:
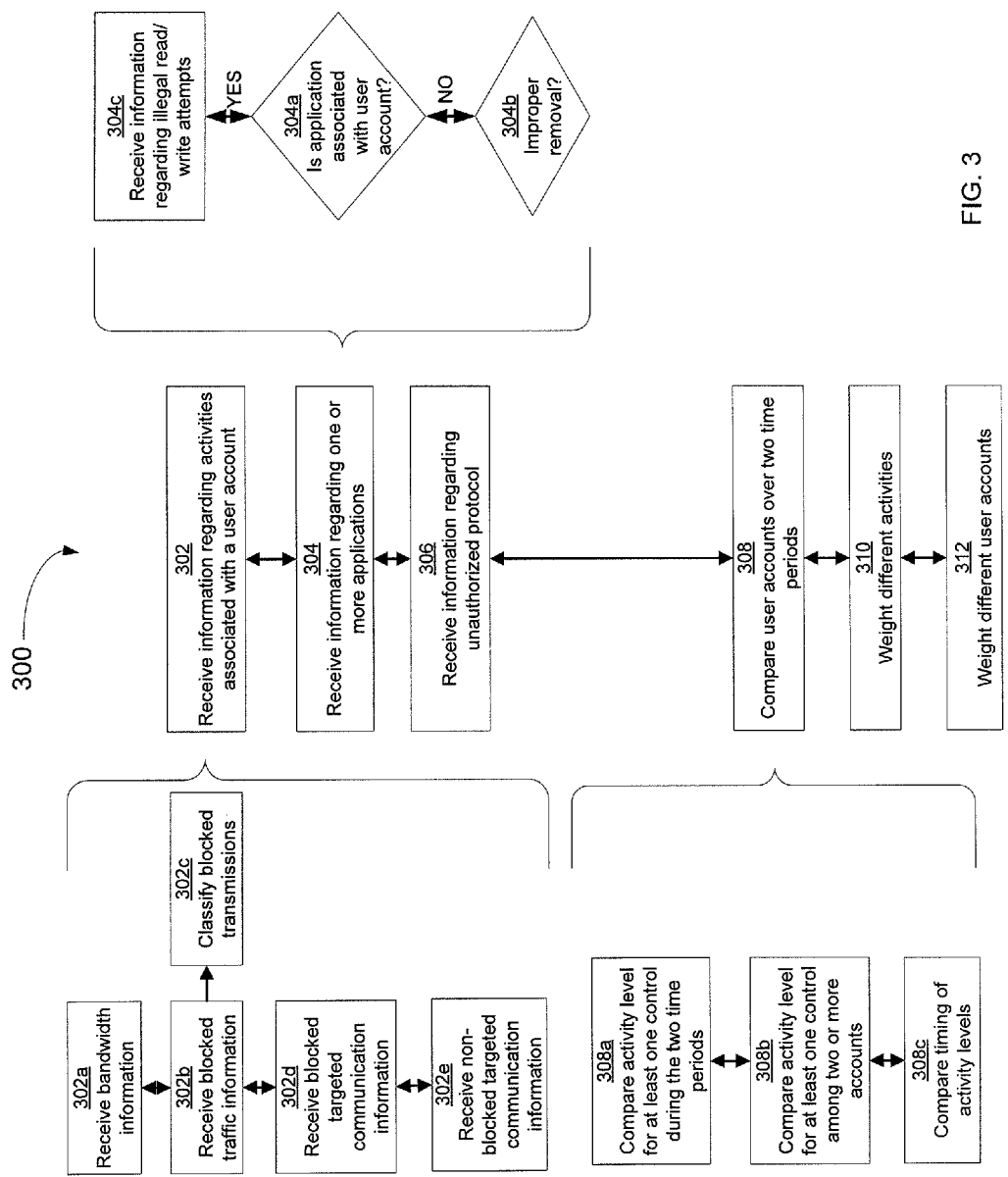
FIG. 3 shows a flow diagram of an illustrative method in accordance with one embodiment.

FIG. 1 illustrates an example of a suitable computing system environment 100 (e.g., for which may be part of illustrative system 200 and/or perform one or more aspects of illustrative process 300 (as shown in FIGS. 2 and 3, respectively). The computing system environment 100 is only one example of a suitable computing environment and is not intended to suggest any limitation as to the scope of use or functionality of the embodiments. The computing system environment 100 should not be interpreted as having any dependency or requirement relating to any one or combination of components shown in the illustrative computing system environment 100.

The embodiments are operational with numerous other general purpose or special purpose computing system environments or configurations. Examples of well-known computing systems, environments, and/or configurations that may be suitable for use with the embodiments include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, the computing system environment 100 may include a computing device 101 wherein the processes discussed herein may be implemented. The computing device 101 may have a processor 103 for controlling overall operation of the computing device 101 and its associated components, including RAM 105, ROM 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Although not shown, RAM 105 may include one or more are applications representing the application data stored in RAM memory 105 while the computing device is on and corresponding software applications (e.g., software tasks), are running on the computing device 101. In one embodiment, RAM 105 and/or any other memory may include a security application. The security application may assist in monitoring activity of one or more user accounts on one or more other devices, such as devices 141 and 151, which are described in more detail below Communications module 109 may include a microphone, keypad, touch screen, and/or stylus through which a user of computing device 101 may provide input, and may also include one or more of a speaker for providing audio output and a video display device for providing textual, audiovisual and/or graphical output.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Alternatively, some or all of the computer executable instructions for computing device 101 may be embodied in hardware or firmware (not shown). As discussed above, memory 115 may comprise one or more security applications, some of which will be described below.

Database 121 may provide centralized storage of response information. Processor 103 may access the response information from database 121 and process the response information that may be included in an interactive response to a user. While database 121 is shown to be internal to computing device 101, database 121 may be external to computing device 101 with some embodiments.

Computing device 101 may operate in a networked environment supporting connections to one or more remote computing devices, such as user terminals 141 and 151. Additional computing devices and the arrangement of such devices are described in illustrative embodiment shown in FIG. 2. The user computing devices 141 and 151 may be personal computing devices or servers that include many or all of the elements described above relative to the computing device 101.

The network connections depicted in FIG. 1 include connections through multiple networks. For example, in one embodiment, a local area network (LAN) 125, may be an organization's intranet, and a wide area network (WAN) 129, may be the Internet. In one embodiment implementing a LAN networking environment, computing device 101 may be connected to the LAN 825 through a network interface or adapter in the communications module 109. When used in a WAN networking environment, the server 101 may include a modem, modem, or interface in the communications module 109 or other means for establishing communications over the WAN 129, such as the Internet 131. Thus, from a security perspective, one user account may be configured to access a LAN, such as LAN 125, however, not to access one or more WANs, such as WANs 129/130.

It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages. The network connections may also provide connectivity to a CCTV or image/iris capturing device.

Additionally, one or more application programs 119 used by the computing device 101, and/or user terminals 141/151 according to an illustrative embodiment, may include computer executable instructions for invoking user functionality related to communication including, for example, email, short message service (SMS), and/or other targeted communications applications that transmit communications from a user account to a second user account (whether internal or external to the organization or domain of the first user account).

Embodiments of the invention may include forms of computer-readable media. Computer-readable media include any available media that can be accessed by a computing device 101. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method in accordance with aspects of the embodiments is contemplated. For example, aspects of the method steps disclosed herein may be executed on a processor on a computing device 101. Such a processor may execute computer-executable instructions stored on a computer-readable medium.

Referring to FIG. 2, an illustrative system 200 for implementing methods according to some embodiments is shown. As illustrated, system 200 may include one or more workstations 201. In one embodiment, workstations 201 are similar to user terminals 141/151 shown in FIG. 1. Workstations 201 may be local or remote, and are connected by one of communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc. Connectivity may also be supported to a CCTV or image/iris capturing device.

With some embodiments, illustrative system 200 may support an interactive system as will be further discussed. For example, workstations 201 may function as user terminals and server 204 may function as a security application control system that monitors activities of multiple user accounts on workstations 201. As understood by those skilled in the art, the steps that follow in the FIGS may be implemented by one or more of the components in FIGS. 1 and 2 and/or other components, including other computing devices.

Aspects of the invention are directed to collecting, analyzing, and utilizing data to create a threat rating for one or more users. In one embodiment, a threat rating may be determined for several user accounts within an organization or domain. FIG. 3 shows flow diagram 300 for ranking a plurality of users, user accounts, and/or terminals that represent a threat to an organization. In one embodiment, one or more of the "user accounts" may be associated with a particular individual, such as an employee of an organization. Thus, regardless of whether the individual is using user terminal 141, user terminal 151, or any workstation 201, the individual's actions may be tied to a particular user account. The same user may have one or more logins or other credentials, which may be logically correlated to that single user or individual. In an alternative embodiment, a "user account" may be associated with a particular computing device. Thus, in one embodiment, if any of a plurality of individuals use a particular computing device, such as user terminal 141, the computing device will be a specific user account. In another embodiment, a "user account" may be a combination of specific user(s) on specific computing device(s). Other factors may consider demographic information, as will be discussed below.

As would be understood by those skilled in the art, it is quite common for a subset of user accounts within an organization or domain to have access to resources not available to other user accounts within the same organization or domain. Unlike prior art systems, embodiments disclosed herein may be used to implement, monitor and review a ranking system across an organization or domain having users and/or user accounts with security features that differ from other users and/or user accounts. For example, in one embodiment, each user account may have access to a first network, such as the "Internet" through WAN 131 shown in FIG. 1, however, only a subset of those accounts may have access to a second network, such as specific resources accessible on the organization's or domain's intranet, such as through LAN 125. In one embodiment, the resources may include a centralized store of electronic data that is accessible from several different user terminals 141/151 or workstations 201.

Aspects of this disclosure relate to calculating a baseline activity score. In various embodiments, a plurality of activities serve as controls for monitoring the accounts over a first time period. In one embodiment, a first time period may be 24-48 hours. In certain implementations, enabling the reception of data within the relatively short period may allow IT and/or security personnel to act quickly to prevent or minimize any adverse events. In certain embodiments, monitoring the activity for about 24-48 ensures adequate collection of data. In yet other embodiments, a longer or shorter duration of time may be utilized for the first time period. The values received for each control may be compared with values from the controls during a second time period. Thus, one time period may be used to calculate "historic" data to use as a baseline activity score, which may include all or some of the user/user account's past activity. Likewise, a different time period (which may fall within or outside of) the initial time frame, may provide data utilized in calculating a predictive threat score, such as by comparing changes in the user's activities.

In the illustrated embodiment, block 302 may be implemented to receive an indication of values for one or more activities associated with a user and/or user account. In one embodiment, one or more computer-executable instructions measure at least a portion of the activities on computing devices, such as user terminals 141/151 and/or workstation 201. The computer-executable instructions may be read by processor 103 on device 101 shown in FIG. 1.

Exemplary activities are described below, however, those skilled in the art with the benefit of this disclosure will readily understand that additional or fewer activities may be measured without departing from the scope of the invention. Further, while the exemplary activities are described in relation to block 302, those skilled in the art will understand that such actions may be conducted in relation to one or more additional processes.

In one embodiment, one or more values indicating the bandwidth utilized by a user, account, and or terminal may be received at block 302a. The values may indicate the amount of data received, transmitted, source of data, destination, or combinations thereof. The measured value(s) may indicate the transfer of data through a first network, such as through WAN 131 to the Internet. Thus, in certain embodiments, the values may not measure all traffic through multiple networks, but rather may just be indicative of specific traffic, such as sites that are external to an organization's resources. An indication of blocked and/or unblocked transmissions that violate a predefined rule or criteria may be received (see e.g., block 302b). Regardless of whether the transmissions are blocked or unblocked, the indication may be restricted to a specific network or group of networks. For example, in one embodiment, indications may be for activity on the Internet. Yet in other embodiments, the indications may include activity on the Internet as well as specific network resources within an organization's intranet that may be restricted to certain users or user accounts. In still yet further embodiments, the indications may include only activity on a specific network resource. Thus, unlike certain prior art systems, certain embodiments may allow for the quantification of how many instances the user account's actions on a network are blocked.

Further embodiments may classify the blocked transmissions as posing an ethical threat or a security threat. Although certain prior art systems may classify the type of site by the type of material offered on the site, such as adult content or gambling, such classification is often insufficient or too labor intensive for security or IT professionals to determine if the site is a security threat and/or an ethical threat. Thus, such classification may be inapplicable for determining or predicting the threats to the organization or domain. Block 302c may be implemented to classify the blocked transmission(s). In certain embodiments, classifications may be used in determining a sub-score for one or more controls. For example, a blocked transmissions control may comprise one or more sub-scores. The sub-scores may be based upon classifications of the blocked transmissions. For example, one or more of the blocked transmissions may be classified as either posing an ethical threat, a security threat, or both an ethical threat and a security threat. In one embodiment, content classified as adult, gambling, and/or dating may be considered an ethical threat. For example, sites that may contain objectionable material or material that could not be needed for the individual's job duties may be deemed an ethical violation. In one embodiment, sites that are routinely utilized to transfer proprietary data, such as ftp (file transfer protocol) sites or peerto-peer (P2P) sites may be classified as a security threat. Sites that promote illegal activity, such as introducing malware or viruses may be deemed a security threat. Indeed, certain sites may pose both a security threat and an ethical threat. One or more sub-scores may be weighted differently than another sub-score. Further, weighting may be determined by a quantity of classified activities for a specified time. In yet even further embodiments, weighting of specific activities may be correlated to attributes of the user, user account, and/or terminal. Examples of weighting user attributes are discussed later in this disclosure but are incorporated herein for any discussions relating to controls.

As mentioned above, unblocked transmission may also be considered, such as part of block 302b. In certain embodiments, at least a portion of unblocked transmissions may not violate a usage or security rule. In yet other embodiments, at least a portion of the transmissions may violate at least one usage or security rule, however, are not blocked. In that regard, while it may be desirable to block transmissions that pose a serious threat to the organization, blocking each transmission of data that violates any rule could reduce productivity, efficiency, and frustrate both the holder of the blocked user account, the IT department, and/or any third party that needs to receive the transmission, such as time-sensitive material. Thus, certain embodiments may not block transmissions that violate one or more predefine rules, however, indications of such improper transmission may be considered when constructing a threat rating in accordance with various embodiments of the invention. In some embodiments, the non-blocked transmission may be altered to partially or wholly remedy the violation. For example, if an organization prohibits the transmission of certain identifying information, such as Social Security numbers, the number may be removed from the transmission and then transmitted.

Similar to blocked transmissions of block 302b, unblocked transmissions may be classified as either an ethical threat and/or a security threat. In further embodiments, the criteria for classifying unblocked transmissions as an ethical, security, or other threat may be the same as the criteria utilized to classify blocked transmissions. Yet in other embodiments, at least one criterion differs from at least one criterion utilized to classify blocked transmissions.

Further embodiments may also monitor (or receive indications from the monitoring of) targeted communications applications. As used herein, a "targeted communication application" encompasses those applications that allow a first user to directly communicate with another individual. For example, common targeted communication applications include, but are not limited to: electronic mail (e-mail), instant messaging (IM), chatting, and combinations thereof. Such applications may allow one account associated with a first user, which may be an employee of the organization to transmit and/or receive electronic information directly with a second account associated with a second user, which may be external to the organization. Often, organizations filter outgoing email and block transmissions that violate one or more predefined criteria. For example, if the transmission contains inappropriate material or is of a certain size, it may be blocked or otherwise prevented from reaching the intended account in the typical manner.

In one embodiment, block 302d may be implemented to receive an indication of blocked communication (transmission) through a targeted communication application. The indication may indicate what application was blocked, why the application was blocked and other information. In one embodiment, the blocked communication is classified as a security and/or ethical threat. Such information may be stored in a database and accessible by a graphical user interface ("GUI"), including by methods described in more detail later in this disclosure. Indeed, any information collected, transmitted, or received herein may be preserved and utilized for display in a GUI.

In certain embodiments, non-blocked communications (transmission) through one or more targeted communication applications that violate at least one predefined criteria is considered (block 302e). Block 302e may be performed in conjunction with or independent of block 302d. As discussed above, blocking each transmission that violates any rule could reduce productivity, efficiency, and frustrate both the holder of the blocked user account, the IT department, and/or any third party that needs to receive the transmission, such as time-sensitive material. Thus, certain embodiments may not block transmissions that violate one or more predefine rules, however, indications of such improper transmission may be considered when constructing a threat rating in accordance with various embodiments of the invention. In some embodiments, the non-blocked transmission may be altered to partially or wholly remedy the violation. For example, if an organization prohibits the transmission of certain identifying information, such as Social Security numbers, the number may be removed from the transmission and then transmitted.

While several different types of data are received within block 302, such as from sub-blocks 302a-302e, there is no requirement that the data is treated equally. Indeed, as discussed above, block 302c may be implemented to distinguish activities that may pose an ethical threat or a security threat. In this regard, certain aspects of this disclosure relate to the weighting of different data. Discussions relating to weighting are provided further in this disclosure, however, the reader is advised that such weighting may be conducting before, during, or after almost any process described herein. For example, data may be weighted as it is collected, further weighted in a sub-block (e.g., 302c), and data that is collected from several different sources may then be weighted when compared with other data. Illustrative processes will be discussed in more detail later.

Block 304 may be implemented to receive information regarding one or more applications associated with a user, user account, and/or terminal. In one embodiment, the information relates to whether a security application is associated with the user, user account, or terminal. The security application may be installed on user terminals 141/151 or workstation 201. In other embodiments, the security application may be active on a centralized server or device, such as device 101. Those skilled in the art will readily appreciate that one or more applications may be active at multiple locations and at different times. Block 304a may be implemented to determine if a specific application is associated with a user, user account, or terminal. This process may be advantageous to detect new account users who may not have the security application. It may also be implemented to ensure that user accounts and/or terminals are associated with an up-to-date version or patch of the application.

If at block 304a, it is determined that the user account or terminal is not associated with an application, block 304b may be implemented to determine if the application has been improperly disabled or removed. If it's determined at block 304a that the user, user account and/or terminal is associated with the security application, then one or more indications regarding the application may be received. In one embodiment, block 304c may be implemented to monitor (or receive an indication of) illegal storage attempts. For example, the security application may be implemented for data loss prevention purposes and can monitor illegal write attempts. For example, some users, user accounts, and/or terminals may be prohibited from writing to removable storage devices, such as USB thumb drives. Thus, block 302c may provide an indication of any such attempts. While the illustrative embodiment is described in relation to "write" attempts, those skilled in the art will readily appreciate that "reading" from certain sources may also violate one or more predefined rules. Information associated with the illegal write/read attempts may also be collected. Illustrative information may include, but is not limited to: the filename, the size of the file, the location of the file, or any metadata regarding the file.

Further embodiments may determine if any communications are conducted using an unauthorized protocol. For example, employees of an organization may attempt to circumvent security measures by creating a self-signed security certificate or using a proxy server. Block 306 may be implemented to determine if transmissions through a first network (such as the Internet through WAN 129) is transmitted or received using an unauthorized protocol.

As discussed above, blocks 302-306 (as well as additional processes) may provide information regarding a user, user account, and/or terminal's activity (a.k.a. user attributes). The information may relate to attributes, such as usage, during a relatively short time period, such as 24-48 hours to quickly and effectively detect threats that may be posed against an organization. In certain embodiments, however, such as before major deadlines, users, user accounts, and/or terminals may appear to show a rise in improper or unauthorized activity that is unwarranted. Furthermore, certain user, user account, and/or terminals naturally will show more activity than other users, user accounts, and/or terminals given the inherent nature of the individual's job associated with that user, user account, and/or terminal. Thus, values obtained during the first time period may be compared with other values (such as historical data) to more accurately determine the ranking. For example, in one embodiment, the values of controls received over the first time period (such as through blocks 302, 304, and/or 306) may be compared with values obtained over a second time period (i.e., block 308). In one embodiment, the second time period is longer in duration than the first time period, and thus may form a baseline activity level for that user. For example, the second time period may be about one month, about 45 days, or about 2 months. Indeed, any amount of time is to be within the scope of this disclosure. Further, the first and the second time periods may be overlapping, such as the first time frame may include the most recent 2 days while the second time period includes the most recent 45 days. Those skilled in the art will readily understand that the length of the time periods may depend on a myriad of factors, including the type of activity conducted, the organization's structure and activities, the IT infrastructure, and other factors.

By comparing values obtained during the first period with values of the same user, user account, and/or terminal during the second period, it may be determined if a user, user account, and/or terminal's activity is abnormal. Each activity measured (or notification of the results of such measurements) may be accorded a different weight, for example, a security threat may be weighted differently than an ethical threat. Likewise, a blocked transmission may be weighted differently than a transmission that is not blocked, however, contains improper material. As shown, illustrative block 310 may be implemented to weight different activities. Table 1, described below in relation to block 310, provides one illustrative weighting scheme that may be implemented in block 308 or any other process in accordance with the invention. While block 308 is shown below block 306, those skilled in the art will readily appreciate that block 308 may occur before, during, or after any block. In one embodiment, one or more processes may be conducted as soon as the activity is detected.

Illustrative block 308a may be employed to receive an indication if a user, user account, and/or terminal comprises an activity level during the first time period that is over a first threshold level above an average of the same user, user account, and/or terminal during the second time period (denoted hereafter as "spike$_x$", where $_x$ is the specific activity). For example, in one embodiment, each activity considered as part of blocks 302-306 (and even 308) may be considered. Yet in other embodiments, only certain activities, such as the traffic measured in sub-block 302a, is considered. In one embodiment, the predetermined threshold may be about 40% of the average of the user, user account, and/or terminal's activity during the second time period. In other embodiments, the predetermined threshold may be a value less than or greater than 40%.

Block 308b may be implemented to compare a user, user account, and/or terminal with other user, user account, and/or terminals. For example, in one embodiment, an indication may be received to indicate whether a user, user account, and/or terminal comprises an activity level that is over a first threshold level above an average of a plurality of user, user account, and/or terminals for the same time period (hereinafter referred to as "aboveavg$_x$", where $_x$ is the specific activity or control).

The timing of a user, user account, and/or terminal's activity within the first or second time period may be considered in any analysis (see, e.g., block 308c). In one embodiment, an indication may provide information whether the user, user account, and/or terminal comprises an activity level during a time frame within the first time period that is determined to be before or after the average start or end time for that user, user account, and/or terminal. For example, if a user, user account, and/or terminal suddenly shows a lot of activity during a different frame (i.e., about 6 hours before they are scheduled to work) this may be weighted to further increase the user, user account, and/or terminal's ranking. In one embodiment, an amount of activity during a time-frame (such as at least 6 hours before an average start time for that user) may be weighted differently that an amount of activity during a second time frame (such as at least 2 hours before an average start time for that user). In one embodiment, the user, user account, and/or terminal's activity level during a second time period (which may be expressed as an average) is compared with the recent activity level. In other embodiments, certain time frames, such as holidays, weekends may be weighted in additional analysis. However, in some instances users who may frequently access network resources on weekends would benefit from the user-centric approach that considers the user's past activities. In one embodiment, the output of block 308c may be expressed as OffHours$_x$, where $_x$ is the specific activity.

In one embodiment, each of block 308a-308c may be implemented. One illustrative embodiment implementing blocks 308a-308c is described later in this disclosure.

In further embodiments, a weight assigned to an activity may depend on whether the activity occurred within the first time period or another time period (block 310). The second time period may include all past data obtained for the relevant activity. Table 1 shows one illustrative weighting scheme that may be used in accordance with various embodiments of the invention. As shown in Table 1, a weighting applied to an activities may differ from at least one other activity, even if it occurs during the same time frame. Additionally, a weighting applied to an activity may differ depending if the activity occurred during the first time period or during a second time period.

TABLE 1

Exemplary weighting scheme

| Control | Weight - If occurred during first time period | Weight - If occurred during another period (i.e. second time period or all past data) |
|---|---|---|
| Security Threat | 3.5 | 2 |
| Ethical Threat | 1.5 | 1 |
| Unauthorized Protocol | 3.5 | 2 |
| Illegal write attempt | 5 | 3 |
| Blocked Targeted Correspondence | 5 | 3 |
| Access to specific data store | 3.5 | 2 |
| Targeted Correspondence that violates rule | 4 | 3 |

Those skilled in the art will readily appreciate that the above categories are merely illustrative and that other categories may be implemented. Further, at least one of the categories may further be subdivided into one or more subcategories.

In further embodiments, a weight may be assigned to certain user, user account, and/or terminals (see, e.g., block 312). In certain scenarios, it may be advantageous to weight one account differently than another. For example, certain user, user account, and/or terminals may have access to highly sensitive data, thus the potential for adverse events is greater. In this regard, different weights may be assigned to different user, user account, and/or terminals, regardless of what activity is conducted on that account. For example, different weights may be assigned to accounts depending on whether the account has access rights to a specific collection of data, exempt from having the at least one application (such as for example, a security application), the at least one software application is absent; access rights to at least one service has been deactivated, and combinations thereof. Table 2 shows an exemplary weighting scheme that may be applied to one or more user, user account, and/or terminals in accordance with one embodiment of the invention.

| User Account Category | Weight |
|---|---|
| Access to a collection of data | 2 |
| Exempt from application | 1.5 |
| Application missing | 1.5 |
| Exception to monitoring traffic through a network | 1 |
| Exception to monitoring of targeted communication application | 1 |
| Deactivated User | 2 |

Those skilled in the art will readily appreciate that the above categories are merely illustrative and that other categories may be implemented. Further considerations may include, but are not limited to: physical location (e.g., specific city, building, or floor) and or "logistical" locations, such as departments or other organizational structures. Further, at least one of the categories may further be subdivided into one or more subcategories.

Certain aspects of the invention are related to computer-readable mediums, such as including memory 115 that contain computer executable instructions, that when are executed by a processor, such as processor 103, process a unique process that incorporates one or more of the principles disclosed above in relation to blocks 302-312. In one embodiment, the computer-executable instructions may be used to calculate a threat score for a plurality of user accounts. As discussed above, some accounts may have access to a first network (such as the Internet) and at least a portion of the user accounts have access to a second network that comprises a centralized store of electronic data, for example confidential information on the organization's intranet.

In one embodiment, an overall threat score ($f_{overall}$) may be calculated for each of the user accounts. In one embodiment, $f_{overall}$ may be determined according to Equation 1:

$$f_{overall} = \frac{(f_{live} + f_{analytic}) * f_{person}}{100}. \qquad \text{Equation 1}$$

wherein $f_{live}$ includes the calculation of data from a first time period and is calculated for a plurality of activities and $f_{analytic}$ includes the calculation of data from a second time period and is calculated for the plurality of activities of $f_{live}$. Equation 1a may be used to calculate $f_{live}$ for each activity and Equation 1b may be used to calculate $f_{analytic}$.

$$f_{live} = \sum_{x=0^{x}{greaterThan0}}^{n} \left(\frac{weight_{x_{live}}}{2}\right) + \left(\frac{hit_x}{\max_{hit_x}}\right)\left(\frac{weight_{x_{live}}}{2}\right) \qquad \text{Equation 1a}$$

where $x$ specifies a predefined activity selected from a plurality of activities, and $$x_{greaterThan0} = \begin{cases} 1, & hits_x > 0 \\ 0, & hits_x = 0 \end{cases}$$

As discussed above, $f_{analytic}$ includes the calculation of data from a second time period and is calculated for the plurality of activities of $f_{live}$. In certain embodiments, the determination of $f_{analytic}$ may include one or more sub-blocks of 308, including 308a, 308b, and/or 308c. For example, Equation 1b provides on illustrative method:

$$f_{analytic} = (spike_x + aboveAvg_x + offHours_x) * (weight_{x_{analytic}}) \qquad \text{Equation 1b}$$

Wherein in one embodiment, spike is assigned a zero value unless the user account comprises an activity level during the first time period that is over a first threshold level above an average of the same user account during the second time period, aboveavg$_x$ is assigned a zero unless the user account comprises an activity level that is over a first threshold level above an average of a plurality of user accounts for the same time period, wherein offhours$_x$ is assigned a zero unless the user account comprises an activity level during a time frame during the first time period before or after the average start or end time for that user account.

Returning briefly to Equation 1, there is a variable "$f_{person}$." In the illustrated embodiment, herein $f_{person}$ considers any weights given to the user account. In one embodiment, one or more values from block 312 are used for $f_{person}$.

The exact weights and thresholds applied to the equation may depend on a myriad of factors, including but not limited to preference. For example, some organizations may treat certain behaviors or trends as more risky than others. In one embodiment, spike$_x$ is assigned a first integer if the first threshold level of spike$_x$ is about 40% great than the average of the same user account during the second time period. In another embodiment, aboveavg$_x$ is assigned a first integer if the first threshold level of aboveavg$_x$ is above about 30% greater than the activity of the plurality of user accounts for the same time period. In a further embodiment, the offhours$_x$ may be assigned a first integer if the activity level is detected about 6 hours before or after the average start or end time for that user account.

The controls or activities considered for inclusion within the formula to rank the plurality of user accounts may consider any activity, including but not limited to any activity discussed in relation to FIG. 3. Some illustrative activities may include, but are not limited to: a security threat, an ethics threat, blocked communication through the targeted communication application, communication through the targeted communication application meeting the predefined criterion, accessing the centralized store, an attempted illegal storage attempt, and combinations thereof.

Figure 4:
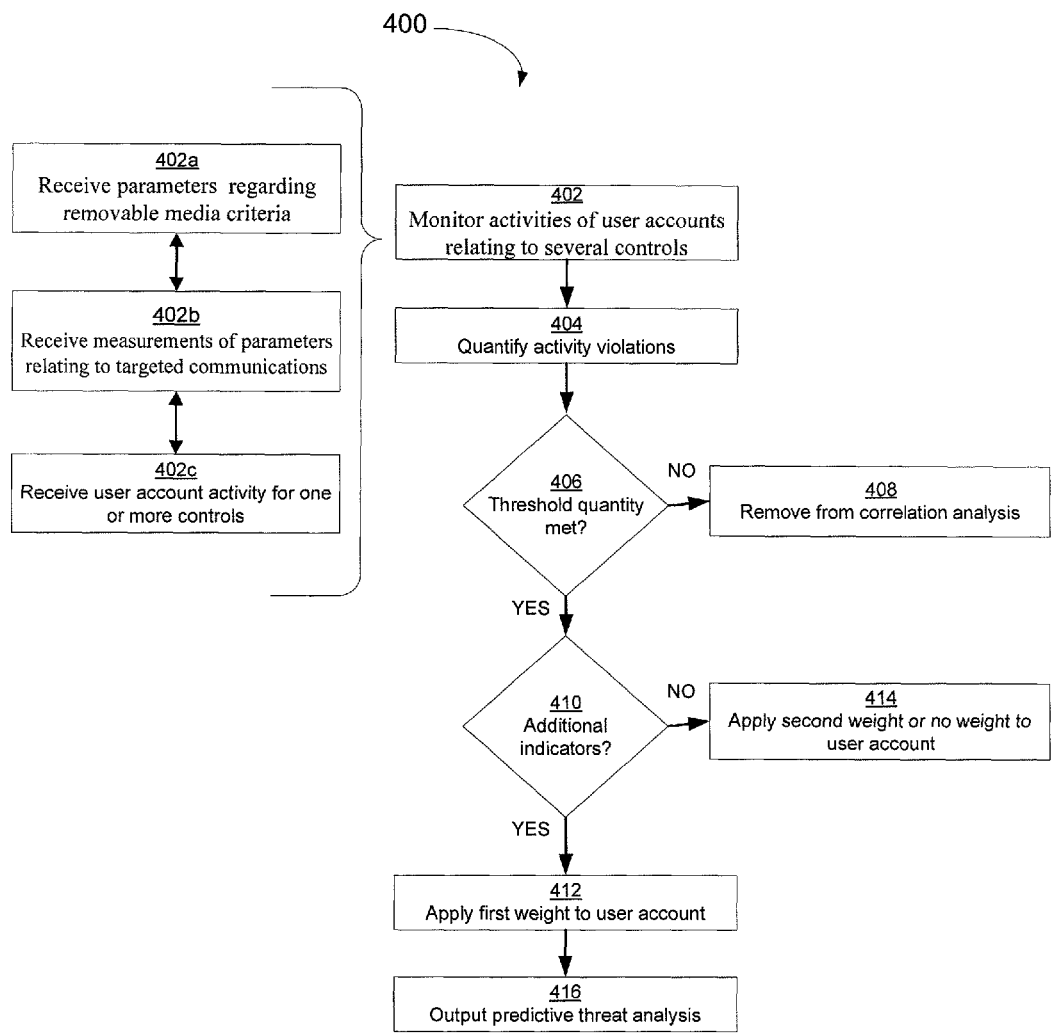
FIG. 4 shows a flow diagram of an illustrative method in accordance with one embodiment.

FIG. 4 shows flowchart 400 of illustrative methods that may be implemented in accordance with various embodiments of the invention. According to certain embodiments, activities of user accounts relating to several controls may be monitored, measured or detected (see, e.g., block 402). Any detectable activity, such as the transmission of electronic information (either receiving or transmitting), may be used as a control as described herein. Some illustrative activities which serve as one or more controls may include, but are not limited to: blocked communication through the targeted communication application, communication through the targeted communication application meeting the predefined criterion, accessing a specific computer-readable medium, an illegal storage attempt, and/or any combinations thereof. Further, several controls may be categorized as in one or more control groups. Indeed, aspects of the invention relate to correlating certain controls that may be detected through different processes.

From the foregoing it is to be understood that the controls may relate to disparate activities associated with user accounts. For example, several different security applications may be implemented across a network to monitor, measure and/or detect disparate activities. Thus, different controls may be grouped into one or more control groups. For example, one entity (such as a commercial establishment having sensitive medical records) may have a first control group comprising controls relating to activity of targeted communications (such as, for example, electronic mail, instant messaging, and/or chatting applications) and a second control group that monitors non-targeted network traffic (such as including communications using HTTP, FTP, and/or other protocols). The groups may be logically or physically distinct as dictated by the security applications implemented, storage of data, entity-specific concerns, or other variables. Yet, a second entity (such as financial institution having sensitive financial data) may have a first group that monitors all traffic (regardless of whether it's a targeted communication or not) using a specific protocol and a second control group that monitors traffic using a second protocol. For example, in one embodiment, an entity may have a secure communications channel that transmits and/or receives traffic transmitted with a first authentication protocol and activities transmitted with another authentication protocol (or in the absence of an authentication protocol) may be within another group. Illustrative methods of detecting secure or encrypted channels, protocols, or "tunnels" are described in U.S. Provisional Application No. 61/325,055, entitled "Detecting Secure or Encrypted Tunneling in a Computer Network," filed Apr. 16, 2010, and U.S. Non-Provisional application Ser. No. 12/829,882, entitled "Detecting Secure or Encrypted Tunneling in a Computer Network," filed Jul. 2, 2010, which are incorporated herein by reference in their entirety for any and all purposes.

Therefore, as used to describe certain aspects wherein, reference to a group is provided to indicate a collection of two or more controls that are detected, measured or monitored by overlapping or different processes, that have a common characteristic with other controls in the group. As discussed in more detail below, aspects of certain embodiments permit consideration of several different security measures for individuals within an entity or domain. Implementation of certain systems and methods disclosed herein may prevent potential security or ethical breaches. For example, even if an entity enacts several individual security measures, a specific user may not meet the "threshold" level to be considered a threat for each individual security measure, despite the fact that they have significantly high activity for other measures, and thus may pose an overall threat or concern. In contrast, with prior art systems, a user who exceeds one security "threshold" level for only a single measure may incorrectly be deemed a security threat to the entity or domain.

Further, those of ordinary skill in the art will appreciate that of receiving an indication of the detection would fall in the scope of "detecting" an activity. Further, "detecting" may refer to the obtaining or receiving an indication of a measurement, which may be based upon a known scale or measurement system. Further, "detecting" may also be used to refer to measuring the absence of an activity. For example, as opposed to an affirmative detection which may reveal that a specific activity occurred 3 times and/or resulted in a measurement of "3x," another detection of the same activity may output the lack of activity between the 3 specific incidences of activity detected above. Illustrative activities are described below, however, those skilled in the art with the benefit of this disclosure will readily understand that additional or fewer activities may be measured without departing from the scope of the invention. Further, while the illustrative activities are described in relation to certain processes or components, those skilled in the art will understand that such actions may be conducted in relation to one or more additional processes.

Figure 5:
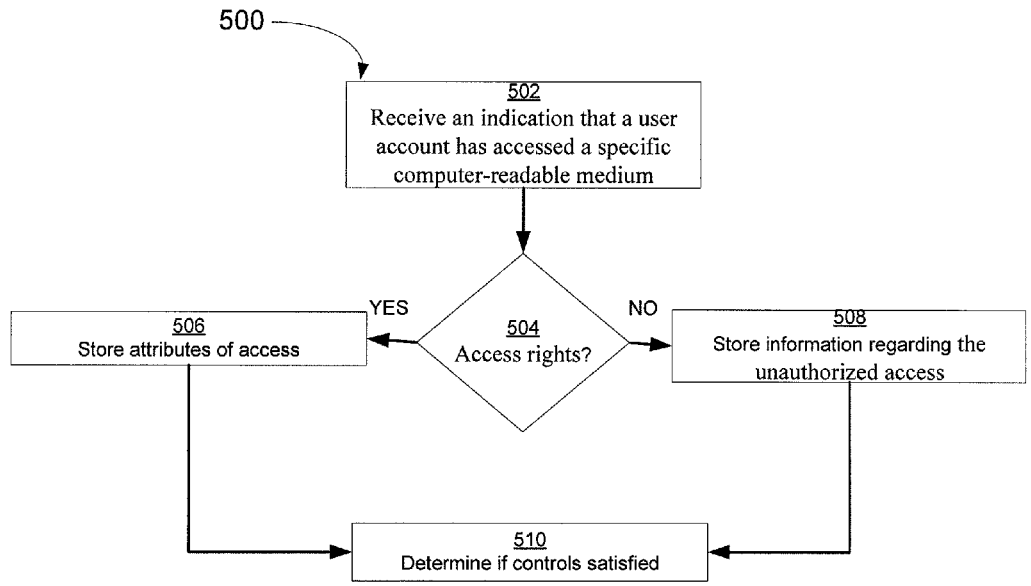
FIG. 5 shows a flow diagram of an illustrative method in accordance with one embodiment.

As discussed above, a first control group may be configured to detect parameters relating to one or more controls, such as regarding removable media criteria (see, e.g., block 402a). FIG. 5 shows a flowchart 500 of illustrative methods relating to removable media controls. In certain embodiments, one or more methods conducted in accordance with the teachings of flowchart 500 may be partially or wholly conducted by a removable media control module 206, which may be located at server 204 of FIG. 2. Although FIG. 5 is explained in the context of removable media, those skilled in the art will readily appreciate that non-removable media may be monitored using many, if not all, of the processes described herein. Therefore, unless explicitly indicated otherwise, non-removable media is within the scope of illustrative embodiments.

Looking first to block 502, one or more processes may be implemented to receive an indication that a user account has accessed a specific computer-readable medium (which may be a removable memory). In one embodiment, block 502 may detect a computer-readable medium operatively connected to computer device, such as for example, through a Universal Serial Bus (USB) connection on devices 141 and/or 151 shown in FIG. 1. In certain embodiments, the detection may be received through a security application. For example, the security application may be configured to monitor illegal write attempts for data loss prevention purposes. For example, some users, user accounts, or terminals may be prohibited from writing to removable storage devices, thus in block 502 an indication of any such attempts may be provided. While the illustrative embodiment is described in relation to "write" attempts, those skilled in the art will readily appreciate that "reading" from certain sources may also violate one or more predefined rules. Information associated with the illegal write/read attempts may also be collected. Illustrative information may include, but is not limited to: the filename, the size of the file, the location of the file, or any metadata regarding the file. In one embodiment, block 502 may compare a value from the computer-readable medium, such as a volume value, a MAC address, or other identifier against a collection of approved identifiers. For example, block 502 may comprises one or more processes to detect any non-approved storage devices.

In certain embodiments, it may be determined whether the user has rights to access the computer-readable medium (see, e.g., block 504). For example, certain systems may be configured to permit a user account to access any and all removable mediums; however, another system may be configured to allow a user account to access certain media types, such as a DVD drive, however, not a flash drive. Another system may be configured to authorize access to certain removable media when a user is logged into a specific device. If it is determined that a user or user account has rights to access a specific medium, one or more attributes (or values thereof) of the access may be stored on a computer-readable medium (block 406). In one embodiment, information regarding the attributes may be stored on memory 115 of device 101 shown in FIG. 1. Illustrative attributes may include, for example, a quantity of data transferred, size or name of a file accessed, time of access, access protocols, among others.

If it is determined at block 404 that a user, user account and/or terminal does not have authority to access the computer-readable medium, information regarding the unauthorized access attempt may be stored (see, e.g., block 508). For example, a security application may determine or otherwise detect an activity violation as a result of the unauthorized access attempt. In one embodiment, information regarding an access attempt may be stored on memory 115 of device 101 shown in FIG. 1. Further, block 508, may be implemented to store attributes of unauthorized storage attempts. Illustrative attributes may include, for example, a quantity of data attempted to be transferred, size or name of a file that was attempted to be accessed, time of attempted access, access protocols attempted, among others.

Block 510 may be implemented to determine if one or more controls have been satisfied. In one embodiment, one or more of the following may be considered a control relating to removable media: detection of an unauthorized access attempt; a threshold of unauthorized access attempts; an attribute of an unauthorized access attempt; detection of a threshold level of authorized accesses; an attribute of one or more authorized accesses; and combinations of one or more of these. While block 510 is shown as being specific to removable medium criteria, those skilled in the art with the benefit of this disclosure will appreciate that the determination of whether controls have been satisfied may be specific to one control group or a plurality of controls groups, including any other collection of controls disclosed herein.

Block 510 or any determination of whether one or more controls have been satisfied may be considered in the context of a time period. For example, a determination of whether two controls have been satisfied, either in the context of block 510 or a combination of disparate activities may be made within a fixed time period. In various embodiments, a plurality of activities serve as controls for monitoring the accounts over a first time period, such as about 7 days. In another embodiment, a time period may be about 24-48 hours. Enabling the reception of data within the relatively short time period allows IT or security personnel to act quickly to prevent or minimize any adverse events. In certain embodiments, monitoring the activity for about 24-48 hours ensures adequate collection of data. The values received for a control may be compared with values from the controls during a second time period. In the illustrated embodiment, block 510 (and/or any other quantification of activities) may be implemented to receive an indication of values for one or more activities associated with a user, user account, and/or terminal. In one embodiment, different activities for various controls may be monitored for about a one week period. In one embodiment, one or more computer-executable instructions measure at least a portion of the activities on computing devices, such as user terminals 141/151 and/or workstation 201. The computer-executable instructions may be read by processor 103 on device 101 shown in FIG. 1.

Returning briefly to FIG. 3, block 302b may be implemented to measure or receive measurements of parameters relating to targeted communications of the user accounts. In one embodiment, targeted communications encrypted with a specific encryption protocol may be monitored or detected by a first security application while targeted communications encrypted with a second protocol or non-encrypted targeted communications (as well as other non-encrypted communications) may be monitored with a second security application or method. Despite comprising similar actions, many prior art systems may not correlate an unauthorized email transmitted through one mechanism with a second unauthorized instant message transmitting similar information. Thus, depending on a particular configuration disclosed herein, multiple control groups may be monitored to correlate activity violations.

Figure 6:
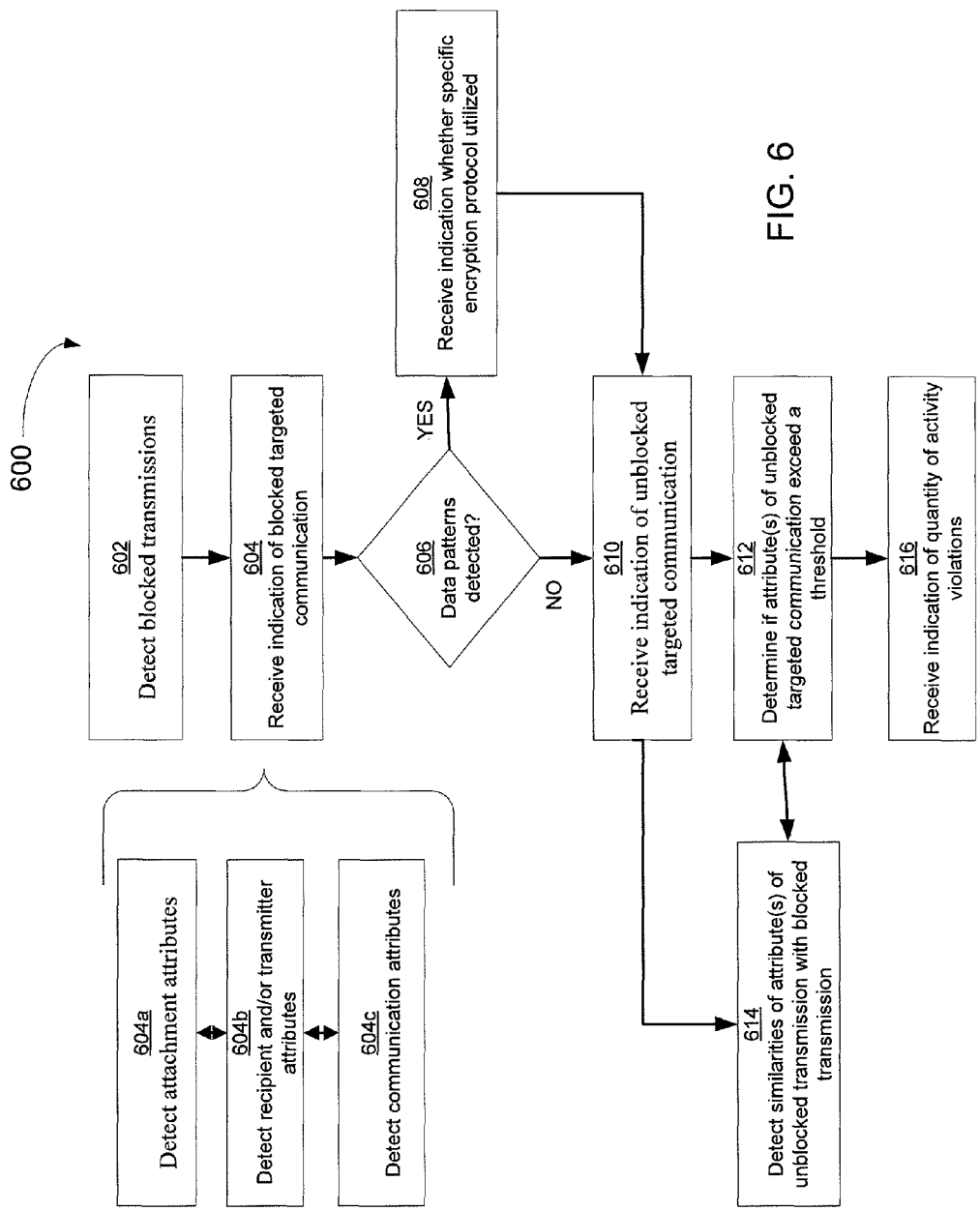
FIG. 6 shows a flow diagram of an illustrative method in accordance with one embodiment.

FIG. 6 shows a flowchart 600 of illustrative methods that may be implemented to detect activity violations relating to targeted communications in accordance with various embodiments. In certain implementations, one control group may monitor all targeted communications, yet in another embodiment, one control group may only monitor targeted communications conducted with a certain protocol or encryption, and a second control group may monitor further targeted communications. In still yet further embodiments, a single control group may monitor targeted communication and non-targeted communication. For simplicity, illustrative implementations will be discussed below; however, the reader is advised that the illustrative embodiments provide an overview of one collective embodiment and that other embodiments are taught by the disclosure of these embodiments. In certain embodiments, one or more methods disclosed in relation to flowchart 600 may be performed, at least partially, by a targeted communication control module 208 (FIG. 2), which may be located within or otherwise associated with a server, such as server 204 of FIG. 2.

In one embodiment, systems or methods may be implemented to detect transmissions that violate at least one criterion or rule. For example, certain embodiments may detect a blocked transmission (see, e.g., block 602). In one such embodiment, blocked transmissions using a certain encryption protocol may be detected. Certain encryption protocols may scan a targeted communication for specific patterns. For example, certain implementations may prevent the transmittal (including the reception of) confidential or proprietary information, including but not limited to: social security numbers, medical data, or other information. In other embodiments, certain encryption protocols may prevent types of attachments to be transmitted.

The indication of blocked transmissions may be restricted to a specific network or group of networks. For example, in one embodiment, controls may be specific to activity on the Internet. Yet in other embodiments, the indications may include activity on the Internet as well as specific network resources within an organization's intranet that may be restricted to certain user accounts. Still yet further embodiments may be specific to activities concerning specific network resources. Thus, unlike certain prior art systems, certain embodiments may allow for the quantification of how many instances the user account's actions on a network (or networks) are blocked.

In accordance with various implementations, a targeted communication may be blocked upon detecting an attribute of the transmission (block 604). In one embodiment, an attribute relates to an attachment of the targeted communication (see, e.g. 604*a*). For example, in certain embodiments, illustrative attributes that may be utilized include, but are not limited to: file types, such as executable (i.e., *.exe) files, the name of an attachment, size, creation or modification date(s), the presence of data patterns inclusive of words within the attachment, or combinations of these and other attributes. Further embodiments may be configured to detect other attributes, such as information relating to parties (e.g., the recipient or sender) of the targeted communication (e.g. block 604*b*). For example, certain systems and methods may be implemented to block communications to certain domains, such as domains which may be associated with spamming, illegal activities, or providing services not relevant to an employee's job.

In another embodiment, a party's electronic address or username may be considered. For example, if a username or address comprises explicit language or values that violate a predefined rule, certain embodiments may block the transmission. Any other additional attributes may be considered, for example, block 604 may be implemented to detect data patterns in any text or other data being transmitted. For example, emails and chatting sessions may be scanned for patterns relating to types of confidential information.

In one embodiment, block 604*c* may be used to scan the body of an email (or receive an indication of a scan) for the inclusion of a social security number within the body of the email and block 604*a* may be implemented to detect a social security number or other information within an attachment associated with the email. In this regard, blocks 604*a*-604*c* may be conducted simultaneously and/or by a single application. Yet in other embodiments, two or more applications may operate independently to perform one or more of blocks 604*a*-604*c*. Further, in certain embodiments, detection of certain data patterns may result in further analysis. For example, block 606 may determine whether certain data patterns were detected (criteria) within a targeted communication. If, at block 606, it has been determined that certain information is associated with the targeted correspondence, then further attributes may be considered. For example, if a social security number is detected, block 608 may be implemented to confirm that a specific encryption protocol was utilized. Those individuals of ordinary skill in the art with the benefit of this disclosure will appreciate that other attributes may be considered and that blocks 604*a*-604*c* are merely illustrative.

In certain embodiments, which are described further below, the determination of whether an activity violation has occurred may depend on whether certain attributes are detected, such as whether an encryption protocol has been utilized. Yet in other embodiments, the blocked transmission alone due to violation of a guideline may be considered a first activity violation, yet further activity violations related to the same targeted communication may be quantified as a second activity violation.

Further embodiments may monitor or detect attributes of a successfully transmitted communication (e.g., block 610). In one embodiment, block 610 detects successfully transmitted targeted communications. While block 610 is shown after blocks 602-608, those skilled in the art with the benefit of this disclosure will appreciate that step 610 (or any other process) is not required to follow or even be after any other process unless explicitly stated to the contrary. In this regard, block 610 may be conducted independent of blocks 602-608. Looking to block 610, not all activity violations may result in blockage of a targeted communication. For example, activity violations that may be deemed less of a threat to an organization may not prevent transmission of the communication. Nonetheless, repetitive minor violations may be indicative of lack of training, improper procedures, and/or a threat to an organization. Therefore, in certain embodiments, block 612 and/or another process may be implemented to receive an indication that a threshold quantity of unblocked transmissions, including but not limited to unblocked targeted communications, may be associated with the first user, user account and/or terminal.

Block 612 may detect one attribute or multiple attributes. For example, in one embodiment, in block 612 it may be determined how many activity violations occurred in relation to each of several attributes, such as for example: encryption status, attachment violations, identity of the parties, data patterns, words, and combinations thereof. In certain embodiments, a different threshold may be calculated for different attributes. In certain embodiments, exceeding each of the different thresholds may be considered an independent activity violation. Yet in another embodiment, the totality of activity violations for a collection of attributes may be considered in the analysis.

Block 614, which may be part of block 612, another process, or independent of other processes described herein, may be implemented to detect (or receive an indication of) similarities. For example, in one embodiment, a process may receive an indication whether user names and aliases, such as email address, usernames, profiles or other information associated with a user account are similar to a recipient of transmitted information, such as an email address. For example, employees looking to impress their supervisor may want to transmit highly confidential information to their personal email addresses so they may work over a weekend. While the intentions of employee may be genuine, potential disclosure or inadvertent retention of the information could be harmful to the employer and even its clients. Therefore, certain embodiments may implement systems and methods (such as shown by block 614) to detect someone sending files to a personal account. Those skilled in the art will appreciate that systems and methods may be implemented to detect transmissions to other non-personal accounts.

Looking to block 614, further embodiments may be implemented to receive an indication that a transmission, such as for example, an email, post on a forum, accessing a specific site, or other communication comprises a first attribute having a first value that is similar to a second value of the first attribute of a transmission from the user, user account and/or terminal within a first time period. In certain embodiments, blocked transmissions may be weighted differently than unblocked transmissions. In another embodiment, only blocked transmissions may be considered. Information obtained during blocks 602-612 and/or from other systems and methods may be utilized to obtain attribute values from blocked communications. For example, an entity may prefer that certain types of data or correspondence be transmitted using authorized authentication protocols. Thus if an employee attempted to transmit sensitive data through the proper channel but was blocked (such as for violating a security feature, certain embodiments may detect if a similar transmission by the same user account was used to transmit the sensitive data. For example, a signal may indicate that a targeted communication successfully transmitted from the user account comprises a first attribute having a first value that is similar to a second value of the first attribute of a blocked transmission from the user account within a first time period.

In one embodiment, an indication may suggest that a successful transmission comprises a detected similarity to a previous transmission, such as a blocked transmission; therefore, block 614 may be implemented to compare a recipient attribute with a collection of attributes to detect an attribute match. Depending on the embodiment, the collection of attributes may include identifying information of the first user, user account and/or terminal. Thus, a process, which may be performed as part of block 614, may compare user names and aliases with email address attributes of the recipient address to detect someone sending files to a personal account. Yet in further embodiments the collection of attributes may include information relating to a specific third party entity. (for example, it may detect names, or "competitor.com" or may be DNS address of known competitors or spammers).

Block 616 may be implemented to determine if one or more controls have been satisfied (or if any activity violations have been detected). In one embodiment, block 616 may quantify activity violations during a time period. While block 616 is shown as being specific to transmissions associated with a targeted communications, those skilled in the art with the benefit of this disclosure will appreciate that the determination of whether controls have been satisfied may be specific to one control group or a plurality of control groups, including any other collection of controls disclosed herein. For example, detecting a single blocked targeted communication may result in a determination that a control has been satisfied. If however, the blocked targeted communication is within a certain time period in which an unblocked transmission (which may or may not be through a targeted communication) comprises similar or the same attribute values as the blocked targeted communication, then each may be quantified as an activity violation. Yet in other embodiments, the totality of both events within the time period may be considered a single activity violation. In further embodiments, detecting a threshold level (such as 3) of blocked targeted communications within a time period may be deemed a security violation. A determination of whether one or more controls have been satisfied may be considered in the context of a different time periods.

Figure 7:
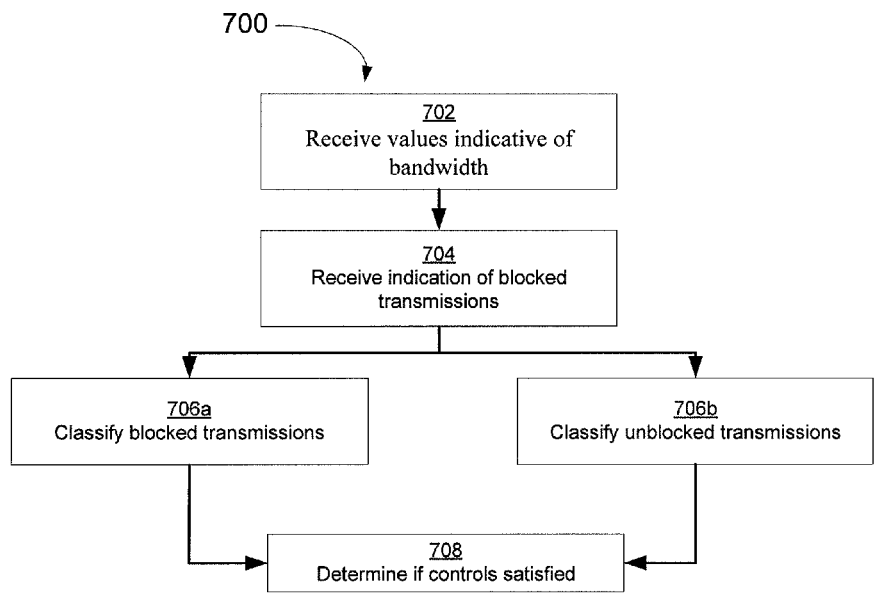
FIG. 7 shows a flow diagram of an illustrative method in accordance with one embodiment.

Those skilled in the art with the benefit of this disclosure will readily appreciate that other control groups may be monitored using variations of the flowcharts and related systems disclosed in relation to FIGS. 5, 6 and 7. In this regard, certain methods may monitor non-targeted transmissions (either separately from or in conjunction with monitoring targeted communications). For example, one or more values indicating the bandwidth utilized by a user account may be received. (See blocks 402c and 702 of FIG. 7). In certain embodiments, a user account control module, such as user account control module 210 (FIG. 2) may be utilized. User account control module 210 may be located within or otherwise associated with server 204 or any other computing device. In this regard, those skilled in the art with the benefit of this disclosure will appreciate that any control modules, including removable media control module 206, targeted communication control module 208, and/or user account control module 210 disclosed herein, may be a single control module, such as control module 212. Yet in other embodiments, one or more control modules may be independent, and/or located on a different computing device.

The values may indicate the amount of data received, transmitted, or combinations thereof. The measured valued may indicate the transfer of data through a first network, such as through WAN 131 to the Internet. Thus, in certain embodiments, the values may not measure all traffic through multiple networks, but rather may just be indicative of specific traffic, such as sites that are external to an organization's resources.

An indication of blocked and/or blocked transmissions enforced upon a user, user account and/or terminal may also be received (see e.g., block 704). The indication of transmissions may be restricted to specific communication protocols, including for example, HTTP, FTP, or any other protocols. The indication of transmissions may also be restricted to a specific network or group of networks. For example, in one embodiment, indications may be for activity on the Internet. Yet in other embodiments, the indications may include activity on the Internet as well as specific network resources within an organization's intranet that may be restricted to certain user accounts. Thus, certain embodiments may allow for the quantification of how many instances the user account's actions on a network are of potential concern and/or blocked.

Further embodiments may classify the blocked transmissions as posing certain types of threats. In certain embodiments, blocked (or even unblocked transmissions) may be classified as an ethical threat or a security threat. (See blocks 706a and 706b). In still further embodiments, certain activities of user accounts may be weighted. Block 708 may be implemented to determine if one or more controls have been satisfied (or if any activity violations have been detected). Similar to block 616, block 708 may be omitted and/or combined with other determinations of whether certain controls have been satisfied.

Returning to FIG. 4, block 404 may be implemented to quantify activity violations of controls within the control groups. For example, information from one or more of flowcharts 500, 600, or 700 may be utilized. In certain embodiments, a threshold quantity of controls being satisfied may cause the user account to be marked or flagged as a potential concern. In certain embodiments, the threshold quantity requires that at least one control be satisfied from at least a portion of the control groups. Yet in other embodiments, the threshold quantity may be satisfied by activity violations within one control group.

If at block 406 it is determined that a threshold quantity is not met, then activity violations of a user account may not be considered in further correlation analysis (see, block 408). In other embodiments, the activity violations may not be totally disregarded from further correlation analysis, however, may be weighted less than activity violations that meet a threshold.

If, at block 406, it is determined that a threshold is met, further correlation analysis may be conducted. In one embodiment, block 410 may be implemented to determine if the user account has additional indicators. An illustrative indicator may include, for example, a prior investigation of another individual. In certain embodiments, a prior investigation of an associate, a peer, or a manager may be used. Such information may be utilized to detect acts of collusion. Further embodiments may consider whether a threshold of controls has been satisfied for another user account or user, such as a user account of an associate, a peer, or a manager. Another indicator may be related to the volume or type of information accessible by the user account. For example, if a specific user account has access to large volumes of sensitive data, monitoring that account may be more important than monitoring other accounts that do not have access to sensitive data. Location of the user and/or usage of user account credentials may be considered in further analysis. For example, a department or other logical distinction between two or more users or user accounts in an organization may be utilized. In other embodiments, physical location identifiers may be utilized. Exemplary identifiers may include, but are not limited to: a state, city, building, floor, or portion of a floor plan.

A further indicator that may be implemented at block 410 or any other process may be whether the user account, user, and/or terminal has an exception to a security policy. For example, certain user accounts may require access to sites not accessible to other user accounts, users, or terminals, thus it may be advantageous to more closely monitor such accounts as the risk for disclosure of information and/or reception of a virus may be increased. In certain embodiments, block 412 or another process may serve to weight certain activity violations once it has been determined that the threshold has been satisfied. For example, in certain embodiments, an indicator may consider whether a recipient address of a targeted communication meets certain criteria, such as being associated with a webmail account and/or appears to be personal address of a user associated with the user account. In another embodiment, if a threshold of activity violations relate to targeted communications, then block 410 or another process may compare the "subject line" or header information to detect similarities. Other embodiments may parse one more fields of the transmission. Further indicators may include factors that suggest suspicious communication activity, either through an intranet or the interne, and whether a user has accessed a specific computer-readable medium during a specific time frame.

In certain embodiments, the presence of a threshold of additional indicators (e.g. at block 410) may weigh the user, user account and/or terminal with an elevated "risk" ranking (see, e.g., block 412). The absence of additional indicators or the lack of a threshold of additional indicators may result in the user account being associated with a less-elevated "risk" ranking (see, e.g., block 414). In other embodiments, the user account may not be factored into any risk ranking unless a threshold of additional indicators are met.

Block 416 may be implemented to output a predictive threat analysis of one or more user accounts. In one embodiment, a score may be assigned to a plurality of user accounts. The score may be a numeric value (e.g., on a scale of 0 to 100) or may be a letter value (e.g., an A+ to F scale). A score, which may be relative or absolute, may be based upon a threshold quantity of controls satisfied within a first time period. The score may further consider the type of controls associated with any activity violations. In certain embodiments, the score factors the inclusion of additional indicators. The inclusion of additional indicators may consider the quantity and/or type of additional indicators. Information may be stored in a database and accessible by a graphical user interface ("GUI"). In this regard, aspects disclosed herein may be implemented to score and/or rank several users, user accounts and/or terminals. In one embodiment, the ranking or score of several user accounts, users, and/or terminals may be transmitted through a network and displayed as part of a graphical user interface.

In one embodiment, a system which comprises a processor and a memory may be configured to transmit electronic signals configured to display the ranking or score of users, user accounts, and/or terminals. Further embodiments relate to receiving a user input selecting a graphical representation of certain activities or criteria utilized in the ranking. In one embodiment, a graphical display of blocked communications may be displayed. In further embodiments, whether any attributes of the blocked communication were similar to attributes of unblocked transmissions may be displayed. Any aspect that may be utilized in calculating the threat score or ranking may be displayed. Indeed, any information collected, transmitted, or received herein may be preserved and utilized for display in a GUI. A threat analysis module, such as threat analysis module 214 of FIG. 2, which may be located on any computing device, such as server 204 of FIG. 2 may be used in the determination or output of any analysis or score.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments.

We claim:

1. A non-transitory computer-readable medium comprising computer-executable instructions that when executed by a processor perform a method comprising:
    for each of a plurality of users, calculating a baseline activity score, comprising:
        determining values of controls for electronic transmissions associated with the user over a first time period, wherein the controls comprise:
            a bandwidth control relating to a quantity of bandwidth associated with the user over a first network during the first time period;
            a blocked transmission control relating to blocked transmissions associated with the user over the first network during the first time period;
            a non-blocked transmission control relating to non-blocked transmissions associated with the user over the first network during the first time period that violate at least one predefined criterion; and
        calculating the baseline activity score based upon the values of the controls over the first time period;
    for each of a plurality of users, calculating a second activity score, including:
        determining values of the controls for electronic transmissions associated with a second time period; and
        calculating a second activity score based upon the values of the controls over the second time period; and
    for each of a plurality of users, calculating a predictive threat score, including:
        comparing the baseline activity score with the second activity score,
    wherein both of the baseline activity score and the second activity score each include sub-scores and the comparing of the baseline activity score with the second activity score includes:
        comparing a sub-score of the baseline activity score with a sub-score of the second activity score.

2. The computer-readable medium of claim 1, wherein at least one sub-score of each of the baseline activity score and the second activity score is a control sub-score based upon one of the controls.

3. The computer-readable medium of claim 2, wherein there are a plurality of sub-scores and each of the sub-scores are control sub-scores.

4. The computer-readable medium of claim 2, wherein the computer readable medium further comprises instructions that when executed by a processor perform:
  comparing a control sub-score of the baseline activity score against the same control sub-score of the second activity score to determine if a threshold variance exists; and
  weighting the sub-score upon determining that the threshold various exists.

5. The computer-readable medium of claim 2, wherein the computer readable medium further comprises instructions that when executed by a processor perform:
  weighting at least one sub-score of a first user upon determining that the user is in the group consisting of: granted access rights to a specific collection of data, exempt from having at least one software application, the at least one software application is absent; access rights to at least one service that has been deactivated, and combinations thereof.

6. A non-transitory computer-readable medium comprising computer-executable instructions that when executed by a processor perform a method comprising:
  for each of a plurality of users, calculating a baseline activity score, comprising:
    determining values of controls for electronic transmissions associated with the user over a first time period, wherein the controls comprise:
      a bandwidth control relating to a quantity of bandwidth associated with the user over a first network during the first time period;
      a blocked transmission control relating to blocked transmissions associated with the user over the first network during the first time period;
      a non-blocked transmission control relating to non-blocked transmissions associated with the user over the first network during the first time period that violate at least one predefined criterion; and
    calculating the baseline activity score based upon the values of the controls over the first time period;
  for each of a plurality of users, calculating a second activity score, including:
    determining values of the controls for electronic transmissions associated with a second time period; and
    calculating a second activity score based upon the values of the controls over the second time period; and
  for each of a plurality of users, calculating a predictive threat score, including:
    comparing the baseline activity score with the second activity score;
  categorizing at least one transmission associated with a first user into a category of a plurality of categories comprising: a security threat, an ethics threat, and combinations thereof; and
  weighting transmissions categorized in the security threat category according to a first weight.

7. The computer-readable medium of claim 6, wherein the computer readable medium further comprises instructions that when executed by a processor perform:
  weighting transmissions categorized in the security threat category according to a second weight.

8. The computer-readable medium of claim 6, wherein each time period consists of a plurality of discrete time frames; and
  wherein the computer readable medium further comprises instructions that when executed by a processor perform:
    applying a first activity weight to at least one activity if the at least one activity occurred during a first time frame of the respective time period.

9. The computer-readable medium of claim 8, wherein the computer readable medium further comprises instructions that when executed by a processor perform:
  applying a second activity weight to at least one activity selected from the group consisting of: a security threat, an ethics threat, blocked communication of a targeted communication application, communication through the targeted communication application meeting the predefined criterion, an access attempt of the centralized store, an attempted illegal storage attempt, and combinations thereof.

10. The computer-readable medium of claim 8, wherein the first time frame comprises a portion of time selected from a predefined quantity of time before the user is scheduled to utilize a network resource, a predefined quantity of time before or after an average time point the user is active on a network and combinations thereof.

* * * * *